March 27, 1956     J. CARTON     2,739,803
PROCESSES AND APPLIANCES FOR MEASURING AND SETTING INSTRUMENT
Filed March 18, 1952     4 Sheets-Sheet 1
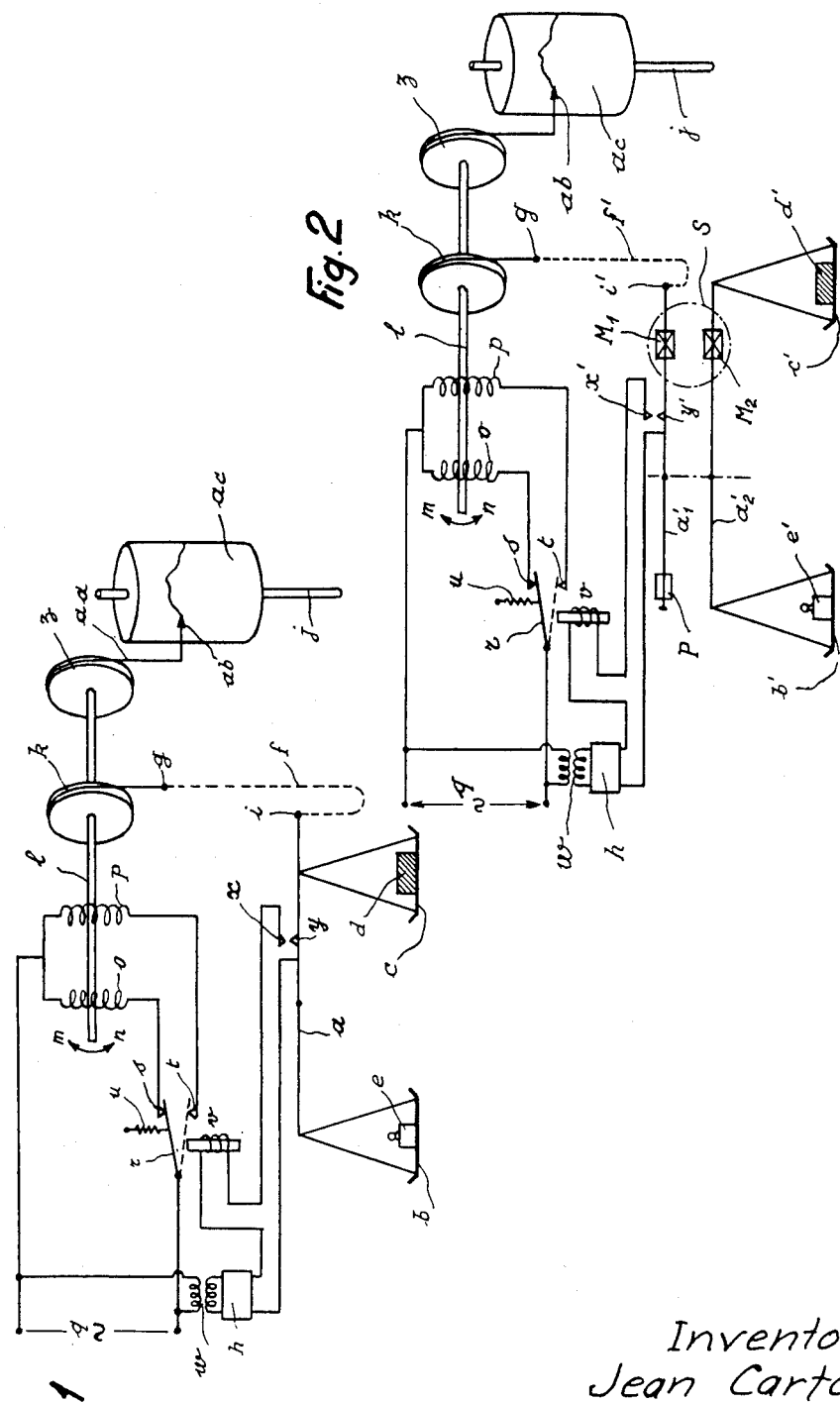
Inventor
Jean Carton
By Robert E. Burns
Attorney

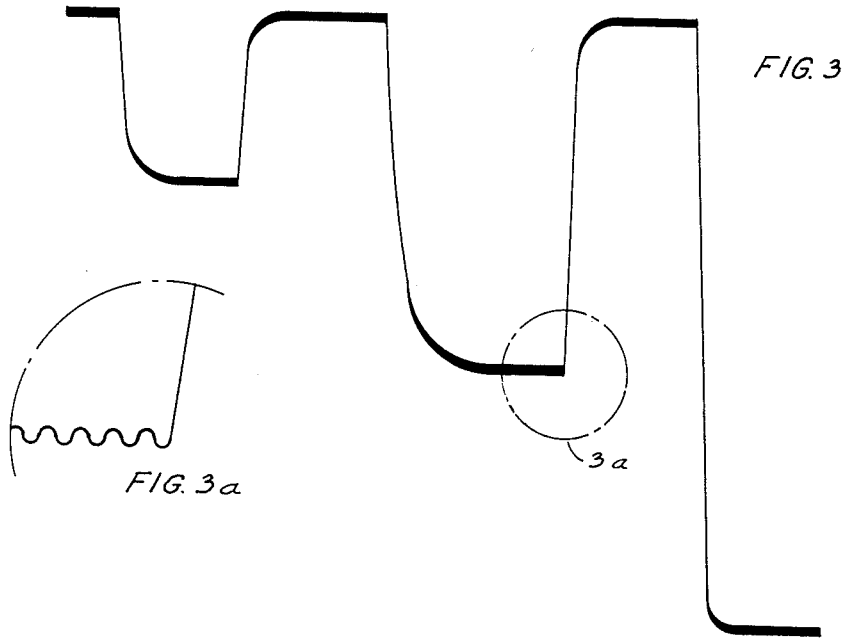
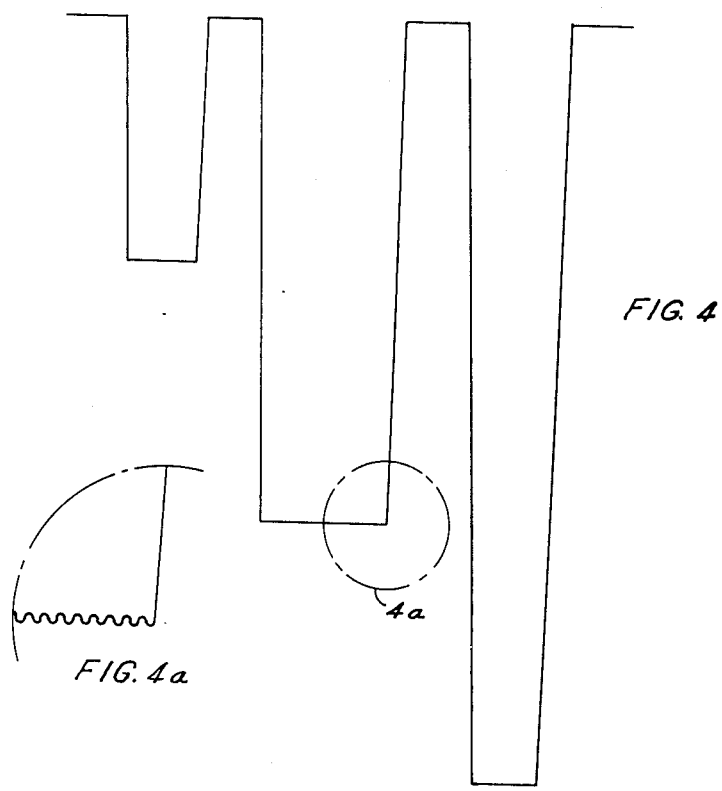

March 27, 1956 J. CARTON 2,739,803
PROCESSES AND APPLIANCES FOR MEASURING AND SETTING INSTRUMENT
Filed March 18, 1952 4 Sheets-Sheet 3

Inventor
Jean Carton
By Robert E Burns
Attorney

March 27, 1956  J. CARTON  2,739,803
PROCESSES AND APPLIANCES FOR MEASURING AND SETTING INSTRUMENT
Filed March 18, 1952  4 Sheets-Sheet 4
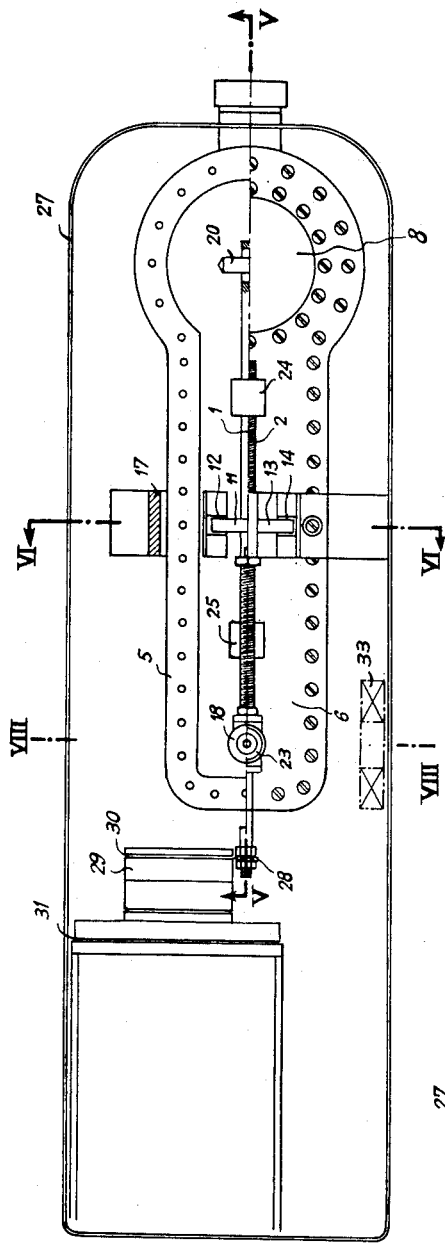
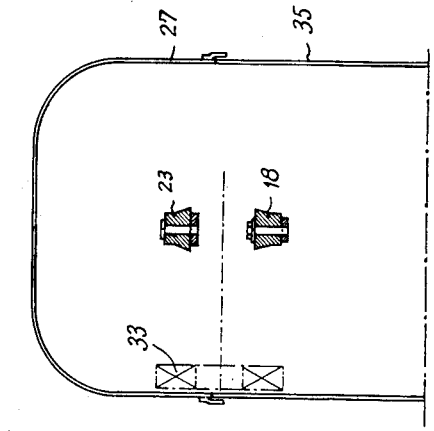
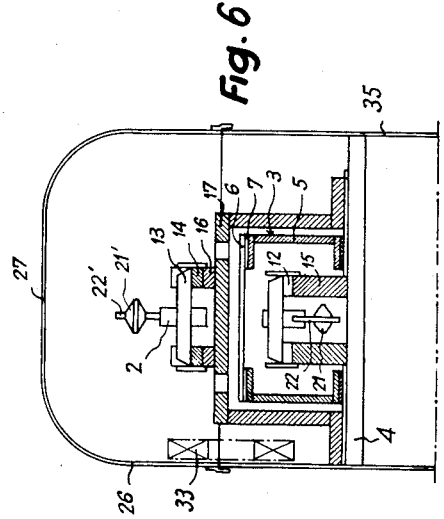
Inventor
Jean Carton
By Robert E. Burns
Attorney United States Patent Office 2,739,803
Patented Mar. 27, 1956

2,739,803

PROCESSES AND APPLIANCES FOR MEASURING AND SETTING INSTRUMENT

Jean Carton, Paris, France

Application March 18, 1952, Serial No. 277,317

Claims priority, application France March 20, 1951

10 Claims. (Cl. 265—7)

Numerous instruments for measuring and the like by means of reference marks comprise at least one movable member which is adapted to oscillate and which is characterized by a natural period of oscillation. In these instruments, the operator has no control over this period of oscillation, the value of which may be objectionable, whether it has some effect on the measuring operation or renders it long and laborious.

It has been ascertained that, by adding to such a member having a periodic motion another member having a motion which is also periodic, the period of the assembly of the oscillating members can be different from that of each of these members considered separately. More particularly, it has been ascertained that the assembly of the oscillating members can generally assume two periodical motions, one of high frequency, the other of lower frequency, these two motions corresponding sensibly to the oscillation of the two oscillating members in phase agreement or opposition, respectively.

In the motion in which the phases coincide, the oscillating members move with a periodic motion in the same manner as if they were connected by means of a rigid mechanical device. For example, if one considers a balance, it is possible to cause the beam to oscillate, no longer alone with its natural period, but in coincidence of phase with a second beam, in the same manner as if one of the ends of each beam was connected to the other by a link; such a connection may permit, for example, subjecting one of the beams to certain constraints, while leaving the second beam relatively free.

In the motion in opposition of phases, the two oscillating members possess a periodic motion of higher frequency than that of each of these two members oscillating separately and than that of these two members oscillating in coincidence of phases.

By means of a judicious selection of the manner of connecting the first oscillating member with the second one, it is therefore possible to modify the oscillation frequency of the first so as to rendering it either lower or higher; in certain cases, it is particularly advantageous to select the high frequency, and, as this selection is rendered possible by the introduction of a resilient connection between the two oscillating members, the invention is concerned not only with the process consisting in associating these two members and in selecting preferably one of the possible periods, but also with the arrangement comprising the means permitting the oscillation of these members according to one or the other manner of motion.

A first manner consists in using for this resilient connection two magnets or two devices producing suitable electro-magnetic fields disposed in such a way that the attractions and repulsions which they exert on each other permit the oscillation of the system, in phase coincidence or opposition.

Another means to obtain the same effect consists in using a resilient mechanical connection, for example a spring which is secured to each end of the oscillating members.

In order to pass from one of the periods to the other, the invention is also concerned with means which, in the case of a magnetic connection, may comprise at least one auxiliary magnetic field tending to approach or separate from each other the oscillating magnetic means, according to given frequency.

This auxiliary magnetic field must be disposed with respect to the oscillating magnetic means in a symmetrical manner, and, more precisely, in such a way that its axis may be situated sensibly in the plane of the field in which the magnetic force is nil, resulting from the whole of the fields.

According to the invention, this auxiliary magnetic field may comprise a solenoid through which is sent an electric current which has a suitable frequency.

The invention is therefore concerned with the process aforesaid, consisting in effecting a measure or a setting by means of reference markings, when the movable members of an instrument of the kind aforesaid oscillate in opposition of phase.

It is also concerned with an arrangement for measuring or setting for carrying out this process, this arrangement comprising an apparatus for measuring or setting of the type comprising a member having a periodic motion, associated with at least one other member capable of having, with respect to the first, a periodic motion in coincidence or in opposition of phase, this arrangement comprising, besides, means for causing the system of members having a periodic motion to pass from one state of oscillation to another.

According to a preferred manner of carrying out the invention the connection between the movable members is of the magnetic kind, obtained for example by means of two magnets each disposed on one of the movable members, in such fashion that the poles facing each other have the same polarity. In this case, again according to the invention, a preferred manner of carrying it out consists in that the means for passing from one of the motions to the other comprises at least one magnetic field, the axis of which is situated sensibly in the plane of the field of zero intensity resulting from the whole of the magnetic means.

An advantageous disposition of such an arrangement for measuring or setting consists in that one of the members may be isolated in a completely closed enclosure, and in this way is protected from any external influence, with the exception of the magnetic subserviency to the other mobile member.

This arrangement may be applied, in a particularly interesting manner to an arrangement of the kind described in the patent application for "Method of and Means for Measurement," filed by me January 10, 1950 (Serial No. 137,877), and in which the movable member of the measuring instrument is subjected to constantly sustained oscillations owing to the controlled action of a servo-mechanism.

There is now described, by way of non-limitative example, the adaptation of the process according to the invention, by reference to the accompanying drawings in which:

Fig. 1 is a diagrammatic view of a balance of known type.

Fig. 2 is a diagrammatic view of the same balance, provided, in addition, with the arrangement according to the invention.

Fig. 3 is a graph of variations of weight, obtained by the apparatus shown in Fig. 1.

Fig. 3a is an enlarged view of the portion of the graph enclosed in the circle 3a in Fig. 3.

Fig. 4 shows a similar curve, obtained by the apparatus shown in Fig. 2.

Fig. 4a is an enlarged view of the portion of the graph enclosed in the circle 4a in Fig. 3.

Fig. 6 is a vertical section along line VI—VI of the Fig. 7.

Fig. 7 is a plan view of an apparatus embodying features of the present invention showing diagrammatically in Fig. 2, the lid of the enclosure being partly removed, and Fig. 8 is a section taken along the line VIII—VIII of the Fig. 7.

Figure 5:
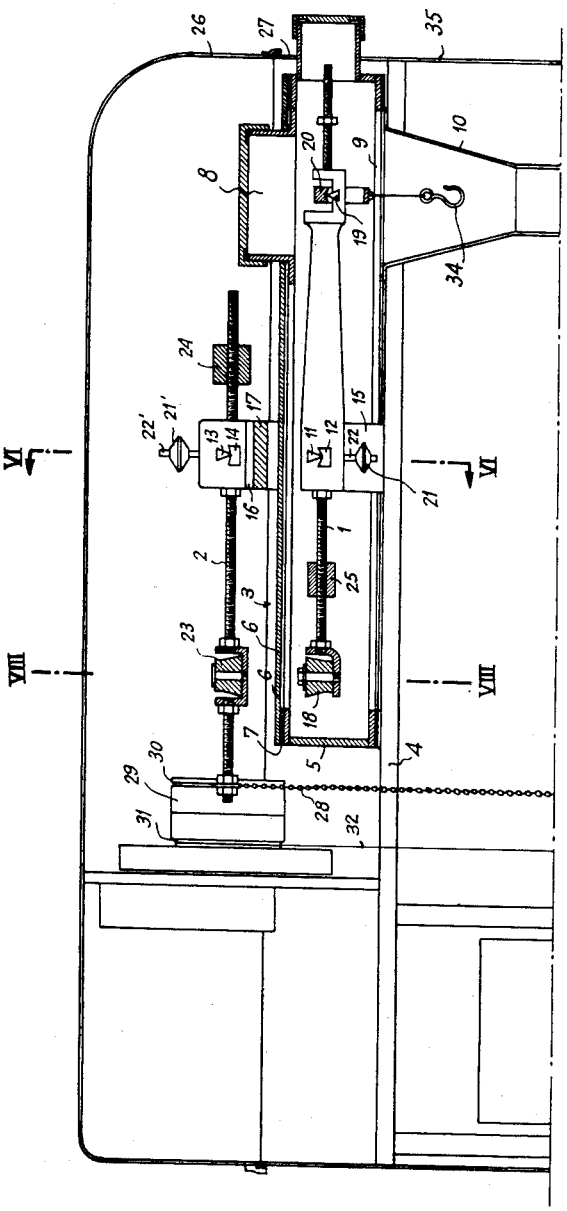
Fig. 5 is a vertical section along line V—V of Fig. 7.

The measuring instrument, represented diagrammatically in Fig. 1 is a balance comprising a beam $a$ and two pans $b$ and $c$. On the pan $b$ are placed weights shown at $e$ to balance the weight of a body $d$. According to a known arrangement, the beam $a$ is provided with a small chain $f$ attached at $i$ the length of which can be altered at will. According to my above-mentioned patent application, the small chain is attached at its other end $g$ to a cord wound on a drum $k$ mounted on an axle $l$, which drum may be driven in direction $m$ or $n$ by one of the two motors $o$ and $p$, the windings on these motors being in opposite directions. These motors are connected to a current source $q$ by means of a switch $r$ adapted to put in circuit either one or the other of these two motors, depending on whether it is in position $s$ or position $t$. When inoperative, this switch is maintained in position $s$ by a spring $u$ and is adapted to be placed in position $t$ by the attraction of an electromagnet $v$ when the latter is energized by an electric current. The current, provided by the same supply $q$ stepped down by a transformer $w$ and rectified by the cell $h$, passes through the electromagnet $v$ when a circuit-breaker, comprising two contacts $x$ and $y$, is closed. The contact $x$ is fixed and the contact $y$ is carried by the beam $a$ of the balance. Finally, the axle $l$ carries a drum $z$ on which there is wound a cord $aa$ connected to a pen $ab$ moving in contact with a cylinder $ac$ turning about an axis $j$.

Assuming that the weight $d$ is smaller than the weight $e$, the beam $a$ will tilt on the side of the weight $e$ and, the circuit-breaker closing, the electromagnet $v$ will be energised, attracting the armature of the switch $r$ into position $t$. The motor $p$ is then in circuit and drives the axle $l$ in the direction $m$ together with the drum $k$, so that an additional weight of the small chain $f$ is gradually added at $i$. As a result the beam $a$ will tilt in the reverse direction, and will break the contact $x$ $y$. The electromagnet $v$ being no longer energized, the armature of switch $r$ being urged by the spring $u$, will move into position $s$, and the motor $o$ which will then be in circuit, driving the axle $l$ in the direction $n$ together with the drum $k$, so that the compensating action of the small chain $f$ will be decreased and a reverse movement will take place, and the cycle is repeated again and again.

The movements of the axle $l$, corresponding to the oscillations of the beam $a$, are transmitted by means of the drum $z$ and the cord $aa$ to the pen $ab$ which records them on the cylinder $ac$.

Owing to this arrangement, the beam $a$, constantly urged in one direction or in the other, slowly oscillates about its real position of equilibrium. The curve recorded on the cylinder $ac$, which corresponds to the displacements of the small chain $f$, which follow those of the beam $a$, is a very fine sinusoid, the amplitude and the period of which are, naturally, functions of the inertia of the electric system and of the sensitiveness of the contact $x$ $y$.

The working of the system that has just been described will be considerably improved by applying to it the means which constitute the object of the present invention, this arrangement being shown diagrammatically in the Fig. 2.

As shown, this diagram is similar to that of the Fig. 1, except for the following differences:

Instead of one beam $a$, the arrangement comprises two superposed beams $a'1$ and $a'2$, situated practically in the same vertical plane. The upper beam $a'1$ carries the contact pair $x'$ $y'$, and the small chain $f$ is fixed to it at its end $i'$. The beam $a'2$ carries the pans $b'$ and $c'$ carrying the load $d'$ and the weights $e'$.

Moreover, the two beams $a'1$ and $a'2$ each carry near their end, magnets M1 and M2, respectively, disposed in such a way that their poles facing each other have the same polarity. An adjustable counterweight P allows the approximate equilibrium of the beam $a'1$ to be obtained before the starting of the arrangement for maintaining the oscillations.

In addition, all the other elements $b$ to $ac$ of the arrangement of Fig. 1 will be found, designated here by $b'$ to $a'c'$, and fulfill the same function.

As has been mentioned, it has been ascertained that the simultaneous oscillations of the beams $a'1$ and $a'2$ can take place, either in phase or in opposition of phase, and the frequencies of these oscillations are very different.

As has been mentioned, it is advantageous to choose the highest frequency, and consequently to cause the oscillation to take place in opposition of phase. It has been ascertained that, generally, the oscillations which tend to take place spontaneously are those that are in phase. In order to pass to the other mode of oscillation, it is sufficient to introduce means bringing about the separation or the approach of the beams, so that the magnets, instead of remaining at a constant distance from each other, are momentarily nearer or further from one another, which starts the motion of high frequency.

According to the invention, these means consist in a solenoid S disposed at any point along the length of the beams, but at such a height that the axis of symmetry of the auxiliary magnetic field may be situated sensibly in the plane of the resulting field of zero intensity of the magnets M1 and M2.

The energising current is sent in the coil S, by any suitable means, at the moment when it is desired to change the period of the oscillations, that is to say, when it is desired to pass, for one reason or another, from one of the frequencies to the other.

It is understood that one can use any other magnetic means equivalent to a solenoid, for example a permanent magnet having a suitable movement.

The function of these starting means is therefore very important and their existence constitutes one of the characteristic features of the invention although one may use any other means for modifying the relative motion of the beams and to pass from one frequency of oscillation to another.

It is advantageous for precision weighing that the means used for bringing about the connection of the beams and the control of the kind of connection, that is to say, of the common period of oscillation, be magnetic, and that in this way all mechanical connections and their inherent drawbacks can be avoided. However, one could provide any other kind of connection of the resilient type, for example a spring, in the event the closed enclosure in which one of the beams may be enclosed is dispensed with, as in the embodiment described in detail hereinafter.

As mentioned, the frequency of oscillation in opposition of phase is much higher than the frequency of oscillation in phase coincidence. This property makes it possible to obtain a record curve much finer, since the displacements of the recording pen in front of the recording drum are caused not by the amplitude of the oscillations, but by their frequency.

As a matter of fact, during each oscillation, the drum $z$ rotates in one direction, then in the other, independently of the amplitude of the oscillation, and the higher the frequency of the oscillation, the smaller is the angle of rotation of the drum, because this rotation is of smaller duration. It follows that the cord $aa$ winds itself along a smaller length, which causes a smaller displacement of the recording pen. This difference is clearly shown on the curves reproduced in the Figs. 3 and 4.

Each of these curves represents the record of the displacements of the pen ab for successive overloads of 1, 2 and 3 decigrams, respectively, with an apparatus of the type shown in Fig. 1 and an apparatus of the type shown in Fig. 2.

Firstly, each level portion of the curve which corresponds to the oscillation without overload on the beam, is perfectly horizontal. This shows that, in both cases, the working of the device is regular. However, the thickness of the line of the level portions of the graph of the apparatus of Fig. 1 is very much greater than that of the lines of the level portions of the graph of the apparatus of Fig. 2. This difference is due, in the arrangement according to the invention, to the increase of the frequency of the oscillations, therefore to the diminution of amplitude of the oscillations of the pen. The fineness of the curve is therefore a very important result of the arrangement according to the invention.

On the other hand, it will be noticed that, for each overload, the passage of one level portion to the other takes place much more slowly on the curve of Fig. 3 than on that of Fig. 4. Particularly, one important rounded portion is noticeable before each level portion is reached. On the contrary, the passage of a level portion to the other takes place, for the curve of the Fig. 4, in a straight line which is almost vertical, which indicates that the balance responds immediately to any variation of the forces applied to its beam. Another important result of the arrangement, according to the inveniton, is therefore a considerable increase in the possible precision of the measurement of variable masses.

As a matter of fact, with the arrangement of Fig. 1, corresponding to the curve of Fig. 3, if the load varies too quickly, there is no time to arrive at the level portion which indicates the exact value of this load. This result, due to the smaller inertia of the apparatus, is therefore particularly advantageous for the measurement of small and continuous variations, which were so difficult to carry out up to now, even with the best known instruments. Owing to the arrangement of the invention, one can now follow variations of the order of a milligram with a balance which is normally sensitive to a decigram.

Finally, the arrangement according to the invention, in which the different elements which are extraneous to the measuring operation, such as the contacts $x'$, $y'$ and small chain $f'$, are connected to a beam which is separate from that to which are applied the forces relating to the measuring operation, permits the isolation of this second beam, that is to say, makes it possible to perform the measuring operation in a completely air-tight enclosure.

Accordingly, there is represented, in Figs. 5 to 8, a balance having the benefit of this advantage, the lower and upper beams being represented at 1 and 2. The beam 1 oscillates in an enclosure which is completely closed, designated by the reference numeral 3, and carried into effect by the assembly of the elements of the balance, a vertical edge 5 and a removable lid 6, disposed on edge 5, with the interposition of an air-tight joint 7. An opening 8 is provided in the lid 6, under the end of the beam 1 supporting the mass to be weighed, and an opening 9 is provided in the base 4 to allow the mass to be weighed to be suspended from a hook 34. In case this mass must remain spaced from the balance, it is suspended in a vertical tube 10 of great height. The beam 1 carries a knife-edge 11 resting upon a support 12, and the beam 2 carries a knife-edge 13, resting upon a support. The supports 13 and 14 are carried respectively by the base 4 and by a hoop 17 surrounding the enclosure 3; the beam 1 carries at one of its ends a magnet 18 and at the other end a knife-edge 19 supporting a stirrup 20 adapted to support the masses to be weighed. The adjustment of the sensitiveness of the apparatus is ensured by an adjustable mass 21 screwed on a threaded rod 22; similarly, the adjustment of the sensitiveness of the beam 2 is ensured by a mass 2' screwed on a threaded rod 22'.

The beam 2 carries at one end a magnet 23, disposed above the magnet 18 so that the opposite poles are of the same polarity, and at the other end an adjustable counterweight 25 of the beam 1, to obtain an approximative equilibrium before the starting of the device for maintaining the oscillations and recording.

The whole is covered with a cover 26, resting on an edge 27, disposed vertically all round the housing 35.

At the end of the beam 2 situated beyond the magnet 23 is hooked the small chain 28 compressing the member on which the servo-motor acts for the purpose of influencing the equilibrium of the beam 2 and constantly causing the oscillations of the latter. It is also the beam 2 which carries the contact element causing the release of the relay controlling the servo-motor, the servo-motor acting in known manner on a drum 29, in the groove 30 of which the other end of the small chain 28 winds itself, and in another groove 31 of which the cord 32 is wound, connected to the pen of the recording apparatus in known manner.

In this embodiment, the means for passing from one of the periods of oscillation to the other is a solenoid 33 which is seen on the Fig. 6 and the magnetic field of which, at the moment when it is the seat of an electric current, acts upon the magnets 16 and 23 with respect to their horizontal plane of symmetry.

Of course, the invention is not limited to the embodiment described and represented by way of example, but includes all matter within the scope of the following claims.

What I claim is:

1. Apparatus for measuring a force, comprising a first oscillatable member having a periodic motion, a second oscillatable member associated with said first member, means resiliently coupling said first member and second member to transmit oscillatory movement from one to the other of said members, the resiliency of said coupling means permitting said members to oscillate selectively in phase or in opposite phase as desired, means for applying to said first member the force to be measured and an opposing force, means for cyclically supplying to said second member a variable balancing force such that the total opposing force acting on said first member including force transmitted from said second member through said resilient coupling alternately exceeds and is less than said force to be measured, thereby imparting oscillatory movement to said member, and means acting upon said members to cause the members to pass into and out of phase oscillation.

2. Apparatus according to claim 1, in which said first member is completely enclosed in an air-tight enclosure, while said second member is outside said enclosure.

3. Apparatus for measuring a force, comprising a first oscillatable member having a periodic motion, a second oscillatable member associated with said first member, a magnetic coupling between said members to transmit movement from one member to the other, said coupling permitting said members to oscillate selectively in phase or in opposite phase as desired, means for applying to said first member the force to be measured and an opposing force, means for cyclically applying to said second member a variable balancing force such that the total opposing force acting on said first member including force transmitted from said second member through said coupling alternately exceeds and is less than said force to be measured, thereby imparting oscillatory movement to said members, and means acting upon said members to change the phase relation of said members from in-phase to out-of-phase.

4. Apparatus according to claim 3, in which said coupling comprises magnets carried by said members and disposed with like poles facing one another.

5. Apparatus according to claim 3, in which said phase-changing means comprises means providing an auxiliary magnetic field counteracting said magnetic coupling of said members.

6. Apparatus for measuring a force comprising an oscillatable balance beam, a second oscillatable balance beam associated with said first beam, a magnetic coupling between said beams to transmit movement from one beam to the other, said coupling comprising magnets carried by said beams and permitting said beams to oscillate selectively in phase or in opposite phase as desired, means for applying to said first beam the force to be measured and an opposing force, means for applying to said second beam a cyclically variable balancing force imparting oscillatory movement to said beams, and means for varying said magnetic coupling to change the phase relation of said members from in-phase to out-of-phase relationship.

7. Apparatus for measuring a force comprising an oscillatable member, a second oscillatable member associated with said first member, a magnetic coupling between said members to transmit movement from one of said members to the other, said coupling means permitting said members to oscillate in phase or in opposite phase as desired, means for applying to said first member the force to be measured and an opposing force, servomotor means for applying a balancing force to said second member, control means for said servomotor means actuated by movement of said second member to increase said balancing force upon predetermined movement of said second member in one direction to check such movement and to decrease said balancing force upon predetermined movement of said second member in the opposite direction, thereby exciting oscillatory movement of said members, and means for determining whether said members oscillate in phase with one another or in opposite phase.

8. Apparatus according to claim 7, in which said coupling means comprises permanent magnets carried respectively by said members and disposed with like poles facing one another.

9. Apparatus according to claim 8, in which said means for determining whether said members oscillate in phase or in opposite phase comprises a solenoid disposed with its axis in the plane of zero intensity in the magnetic field produced by said magnets carried by said members.

10. Apparatus according to claim 7, in which means is provided for recording movement of said servomotor means.

References Cited in the file of this patent

UNITED STATES PATENTS

| | | |
|---|---|---|
| 633,471 | McGarvey | Sept. 19, 1899 |
| 2,306,137 | Pabst | Dec. 22, 1942 |
| 2,663,863 | Buehler | Dec. 22, 1953 |